F. G. ALBORN.
HOUSING FOR MACHINERY.
APPLICATION FILED NOV. 25, 1916.
1,289,353.
Patented Dec. 31, 1918.
2 SHEETS—SHEET 1.
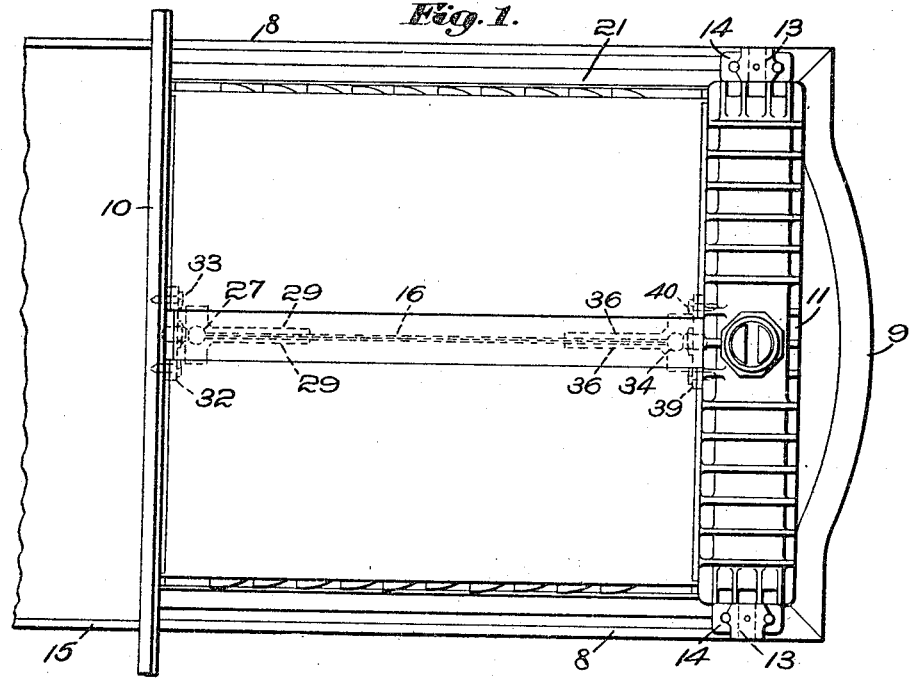
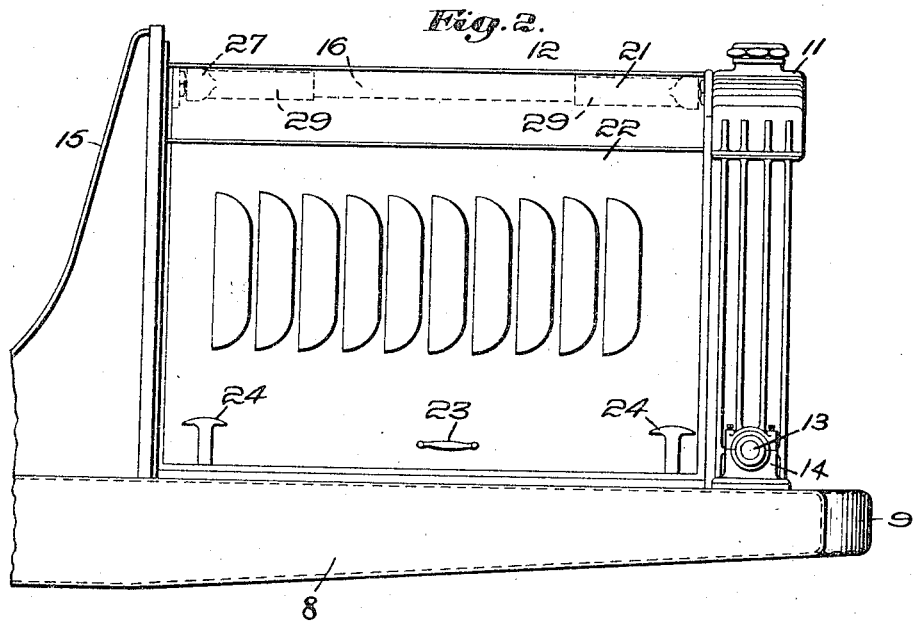

F. G. ALBORN.
HOUSING FOR MACHINERY.
APPLICATION FILED NOV. 25, 1916.
1,289,353.
Patented Dec. 31, 1918.
2 SHEETS—SHEET 2.
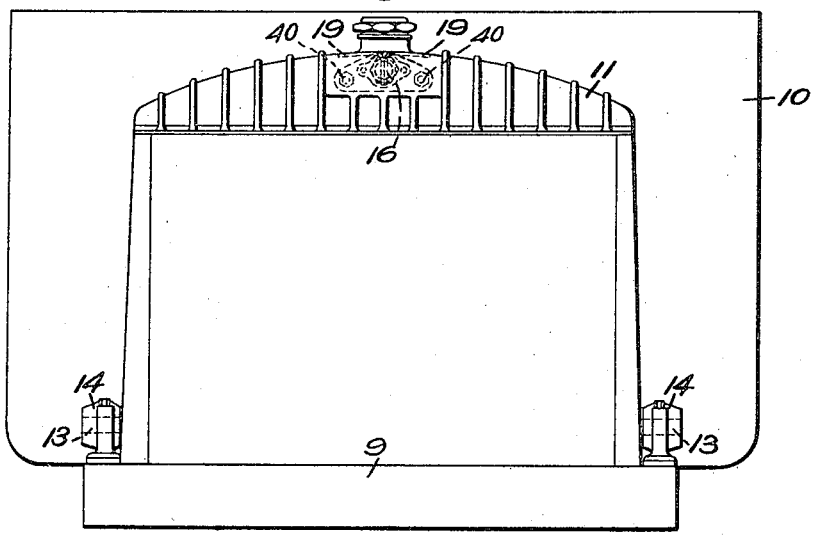
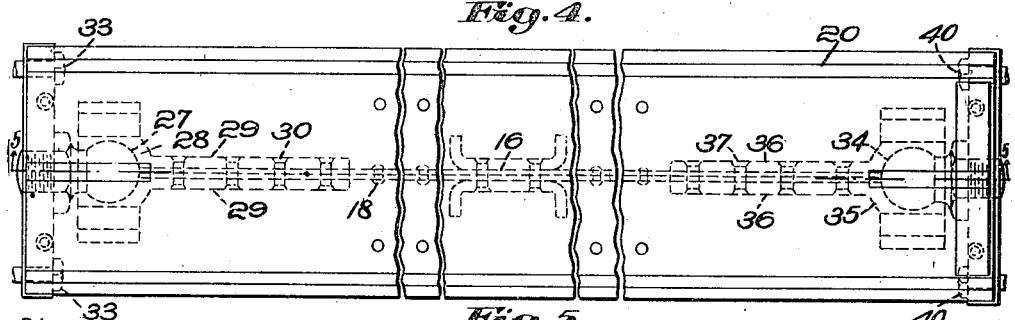
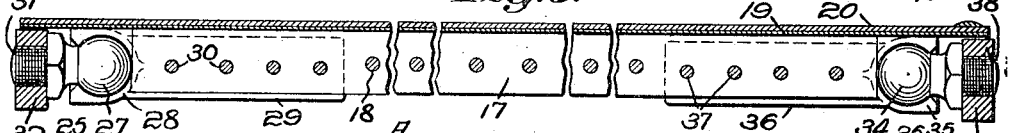
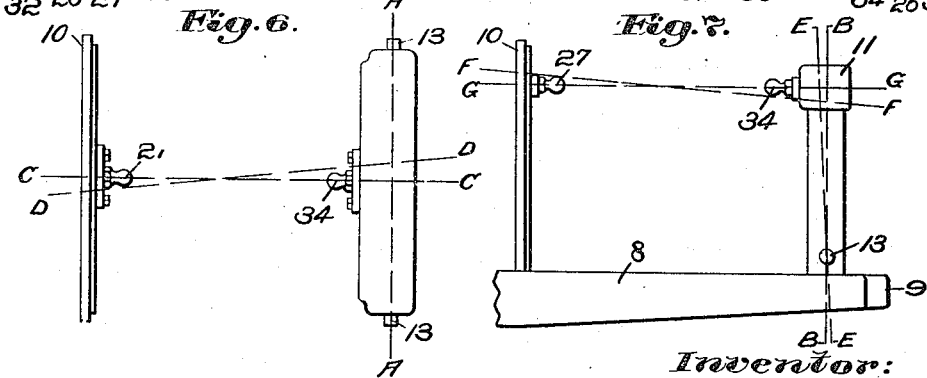
Inventor:
Frans G. Alborn,
Att'ys

UNITED STATES PATENT OFFICE.

FRANS G. ALBORN, OF MILFORD, CONNECTICUT, ASSIGNOR TO THE LOCOMOBILE COMPANY OF AMERICA, OF NEW YORK, N. Y., A CORPORATION OF WEST VIRGINIA.

HOUSING FOR MACHINERY.

1,289,353.  Specification of Letters Patent.  Patented Dec. 31, 1918.

Application filed November 25, 1916. Serial No. 133,468.

*To all whom it may concern:*

Be it known that I, FRANS G. ALBORN, a subject of the King of Sweden, and a resident of Milford, in the county of New Haven and State of Connecticut, have invented an Improvement in Housings for Machinery, of which the following description, in connection with the accompanying drawings, is a specification, like characters on the drawing representing like parts.

This invention relates to housings for machinery, and is more especially concerned with a hood or bonnet combined with a radiator and dash of a motor vehicle, the whole assembly inclosing and furnishing protection for the motor which drives the vehicle.

My invention will be best understood by reference to the following description, when taken in connection with the accompanying drawings of one specific embodiment thereof, while its scope will be more particularly pointed out in the appended claims.

In the drawings:

Figure 1 is a plan of a housing embodying my invention;

Fig. 2 is a side elevation of the same;

Fig. 3 is a front elevation of the same;

Fig. 4 is a plan on an enlarged scale of the central portion of the housing partly broken away;

Fig. 5 is a sectional view, also partly broken away, on line 5—5 of Fig. 4; and

Figs. 6 and 7 are diagrammatic views illustrating the distortions to which the frame is subject, and showing examples of the changes of angular relation between the various parts due to such distortions.

Referring to the drawings, and to the embodiment of my invention which I have selected for illustrative purposes, I have there shown the forward portion of a motor vehicle having a frame comprising usual side members 8—8 connected by a transverse member 9. On this frame is supported a housing comprising a rear hood support herein in the form of a dashboard 10, a radiator or cooler 11, herein having a front hood support, and a hood or bonnet 12, which is interposed between the dashboard and radiator, and in conjunction therewith furnishes a protecting inclosure for the usual motor.

In the use of motor vehicles, especially when traveling over irregular surfaces, there is bound to be more or less distortion of the frame, due to inequalities of the roadway. I have found that, even in the short length of frame intermediate the radiator and dashboard, there is so much distortion as to cause a weakening and occasional fracture of the connecting members or braces, which connect the dashboard with the radiator. A suitable connection of some sort between these two parts is needed, because the radiator would otherwise topple over in a forward or rearward direction. With the numerous peculiar distortions to which the frame is subject, however, as above stated, these connecting braces for the radiators also become distorted, and in time, are very apt to break off at either or both points of connection. This is doubly serious, if, as in the present case, the radiator brace supports the bonnet, as well as serving to position the radiator properly with relation to the dashboard, and it is the aim of my present invention to provide a suitable housing which shall furnish protection to the motor, and provide the desired degree of flexibility to adapt it to the distortions of the frame due to irregularities of the road.

As herein shown, the radiator 11 is supported on the frame 8 by a pair of trunnions 13, the latter being mounted in suitable bearing brackets 14 secured to the frame. The radiator is thus pivotally mounted upon the frame to swing about a horizontal axis A—A common to the two trunnions (see Fig. 6). This being so, it is apparent that there must be provided suitable means to maintain the radiator in approximately upright position, as viewed from the side in Fig. 7, to prevent it from swinging very materially in a forward or rearward direction. In Fig. 7, the median line B—B of the radiator is shown intersecting the axis of the trunnion 13. This median line is normally vertical, or rather at right angles to the plane of the top of the frame members 8, but will, of course, tend to swing about said axis.

It is customary to provide suitable means to brace the dasboard 10 to prevent forward or rearward movement of the latter, such braces being herein exemplified by a pair of brace members 15 disposed at the rear of the dashboard and resting upon and secured to the frame members 8. As a means for connecting the radiator to the dashboard and furnishing support for the hood, I have herein provided means including a brace, or tie-piece, 16 between the radiator and dashboard. For convenience of manufacture, this tie-piece is herein made up of two thicknesses of metal of L-shaped cross section, as indicated in dotted lines in Fig. 3. Vertical webs 17 are riveted together by a series of rivets 18, best shown in Figs. 4 and 5. Horizontal webs 19, best shown in Figs. 3 and 5, directly support a plate 20, constituting an intermediate section of the hood or the bonnet 12. To this intermediate section, constituting a species of ridgepole for the housing, there is hinged a pair of roof sections 21, and to these roof sections in turn are hinged side walls 22, in a manner which it will be unnecessary here to describe. The side walls may be provided with usual handles 23, and may be secured to the frame or sill by usual bonnet fasteners 24, it being understood that the bonnet may be unfastened and raised at either or both sides, to expose the motor in the usual manner.

It must now be evident that, if the tie-piece 16 were rigidly secured to the radiator and to the dashboard, the housing would lack that degree of flexibility which is desirable in view of the distortion to which the frame 8 is subjected. I have, therefore, made suitable provision for flexibly connecting the tie-piece 16 with the radiator and the dashboard, such means herein comprising universal joints 25 and 26. The universal joint 25 herein is of the ball and socket type, comprising a ball member 27 and a socket member 28, the latter being herein made in two halves 29 embracing the tie-piece 16 and secured thereto by a suitable means, herein a series of rivets 30. The ball member 27 is herein provided with a threaded shank 31 screwed into a plate 32, the latter being suitably secured to the dashboard, as by means of bolts 33.

Similarly, the universal joint 26 comprises a ball member 34 and a socket member 35, the latter being composed of parts 36 embracing and secured to the tie-piece 16, by means of rivets 37. The ball member 34 is provided with a threaded shank 38 screwed into a plate 39, the latter being secured to the radiator 11 by bolts 40.

Normally, the centers of the ball members 27 and 34 are disposed in a line C—C which, as viewed in plan in Fig. 6, is coincident with the median line of the vehicle frame, and as viewed in side elevation in Fig. 7, is horizontal and parallel with the plane of the upper surface of the vehicle frame 8. When, however, the frame becomes distorted, as by twisting or bending intermediate the dashboard and radiator, it is evident that a line containing the centers of the two ball members will be disposed at an angle to either or both of the lines C—C and G—G shown in Figs. 6 and 7.

To cite an illustrative case, let us suppose, for example, that the frame 8 should twist in a lateral direction intermediate the dashboard and radiator, so that these parts become laterally displaced as viewed in plan, the centers of the ball members would then lie in an oblique line such as that exemplified by the line D—D in Fig. 6. This freedom of action is permitted by the ball and socket connections between the tie-piece 16 and the dashboard and radiator. It must be evident, however, that, under such circumstances, the actual fore and aft distance between the dashboard and radiator at the level of the tie-piece will tend to shorten. This condition is met by the trunnions 13, which turn in their bearings, permitting the upper portion of the radiator to swing slightly toward the rear, as indicated to an exaggerated extent by the line E—E in Fig. 7.

If, however, the distortion of the frame should be in the nature of a bending of the side members 8 intermediate the dashboard and radiator, it is evident that the tendency to produce relative vertical displacement of the dashboard and radiator would result in the line containing the centers of the ball members assuming some such position as that represented by the line F—F in Fig. 7. It is evident that, under such circumstances, also, there is a tendency to lengthen or shorten the distance between the centers of the two ball members, according to the direction in which the frame members 8 are bent, and that under such circumstances, the radiator will swing on its trunnions in one direction or the other, as the case may be.

During any such distortion of the frame, the described housing will flex and accommodate itself to the conditions with a freedom from strains and breakage which is possible only by that flexibility which is provided by the universal and pivotal connections, and since the bonnet is supported by the tie-piece 16, it will swing to and fro with the tie-piece and will flex in harmony with the relative flexing of the dashboard, radiator and tie-piece.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrative form or embodiment of the invention may be made, without departing from the principles thereof.

Having thus described one embodiment of my invention, what I claim and desire by Letters Patent to secure is:

1. A housing of the class described comprising, in combination, a supporting frame, a pair of supports upstanding from said frame, and a hood interposed between and inclosing a space between said supports, and comprising supporting means, including a supporting member and means flexibly connecting said supporting member with said supports.

2. A housing comprising, in combination, a supporting frame, a pair of supports, one of which is flexibly connected with said frame, and a hood interposed between and inclosing a space between said supports, and comprising supporting means including a supporting member and pivotal connections between said supporting member and said supports.

3. A housing comprising, in combination, a supporting frame, a pair of supports, one of which is flexibly connected with said frame, and a hood interposed between and inclosing a space between said supports, and comprising supporting means including a supporting member and universal joints connecting said supporting member with said supports.

4. A housing comprising, in combination, a supporting frame, a pair of supports one of which is flexibly connected with said frame, and a hood interposed between and inclosing a space between said supports, and comprising support spacing means including a spacing member and ball and socket joints connecting said spacing member with said supports.

5. In a motor vehicle, the combination of a frame, front and rear hood supports supported thereon, and a hood connecting said hood supports, and comprising spacing means for said hood supports including a member interposed between said hood supports and flexibly connected with each.

6. In a motor vehicle, the combination of a frame, front and rear hood supports supported thereon, and a hood comprising an intermediate section and two side sections connecting said hood supports, and supporting means for said intermediate section, including a member interposed between said hood supports and flexibly connected with each.

7. In a motor vehicle, the combination of a frame, front and rear supports supported thereon, and a hood comprising an intermediate section and two side sections connecting said hood supports, and supporting means for said intermediate section, including a supporting member and means flexibly connecting said member with said hood supports.

8. In a motor vehicle, the combination of a frame, front and rear hood supports on said frame in movable relation with each other, and connecting and spacing means between said hood supports, and flexibly connected with each.

9. In a motor vehicle, the combination of a frame, a rear hood support mounted thereon, a radiator mounted on and flexibly connected with said frame, a front hood support, and connecting means between said front hood support and said rear hood support including a brace and flexible devices connecting said brace to said front and rear hood supports.

10. In a motor vehicle, the combination of a frame, a rear hood support mounted thereon, a radiator mounted on and flexibly connected with said frame, a front hood support and connecting means between said front hood support and said rear hood support, including a brace member and universal joints connecting said brace member with said front and rear hood supports.

11. In a motor vehicle, the combination of a frame, front and rear hood supports mounted thereon, and connecting and spacing means having flexible connection with said supports and having means to hold said supports in spaced relation.

12. In a motor vehicle, the combination of a frame, front and rear hood supports supported thereon, a brace member interposed between said hood supports, and universal connections between said brace member and said rear hood support and between said brace member and said front hood support.

In testimony whereof, I have signed my name to this specification.

FRANS G. ALBORN.

Copies of this patent may be obtained for five cents each, by addressing the "Commissioner of Patents, Washington, D. C."

It is hereby certified that in Letters Patent No. 1,289,353, granted December 31, 1918, upon the application of Frans G. Alborn, of Milford, Connecticut, for an improvement in "Housings for Machinery," an error appears in the printed specification requiring correction as follows: Page 3, line 53, claim 7, after the word "rear" insert the word *hood;* and that the said Letters Patent should be read with this correction therein that the same may conform to the record of the case in the Patent Office.

Signed and sealed this 30th day of March, A. D., 1920.

[SEAL.]

M. H. COULSTON,
*Acting Commissioner of Patents.*

Cl. 74—56.